US012188878B2

(12) United States Patent
Nicholas et al.

(10) Patent No.: US 12,188,878 B2
(45) Date of Patent: Jan. 7, 2025

(54) FOREIGN OBJECT DEBRIS DETECTION

(71) Applicant: The Government of the United States of America, as represented by the Secretary of the Navy, Arlington, VA (US)

(72) Inventors: Andrew Nicholas, Glenelg, MD (US); Theodore Finne, Vienna, VA (US); Charles Brown, Beltsville, MD (US); Christoph Englert, Springfield, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 32 days.

(21) Appl. No.: 17/654,581

(22) Filed: Mar. 12, 2022

(65) Prior Publication Data

US 2022/0291139 A1      Sep. 15, 2022

Related U.S. Application Data (60) Provisional application No. 63/161,353, filed on Mar. 15, 2021.

(51) Int. Cl.
*G01N 21/94* (2006.01)
*G01N 21/47* (2006.01)
(Continued)

(52) U.S. Cl.
CPC ............ *G01N 21/94* (2013.01); *G01N 21/47* (2013.01); *G01N 21/8851* (2013.01); *G01V 8/20* (2013.01)

(58) Field of Classification Search
CPC .... G01N 21/94; G01N 21/47; G01N 21/8851; G01V 8/20; G06T 7/00; G06T 7/0008; G06T 1/00
See application file for complete search history.

(56) References Cited

U.S. PATENT DOCUMENTS

| 8,976,245 B2 | 3/2015 | Englert | |
|---|---|---|---|
| 2018/0078963 A1* | 3/2018 | Fridberg | G01N 21/8851 |
| 2021/0325315 A1* | 10/2021 | Ray | G01N 21/94 |

FOREIGN PATENT DOCUMENTS

| CN | 104603839 A | * | 5/2015 | ............... G06T 7/20 |
|---|---|---|---|---|
| JP | 2000333079 A | * | 11/2000 | |
| WO | WO-2018139810 A1 | * | 8/2018 | ............. A63B 69/36 |

OTHER PUBLICATIONS

Lester et al., "Theory of Planetary Photometry," The Journal of the Royal Astronomical Society of America, 1979, vol. 73, No. 5, pp. 233-257, 25 pages.

(Continued)

*Primary Examiner* — Uzma Alam
*Assistant Examiner* — Huy Phillip Pham
(74) *Attorney, Agent, or Firm* — US Naval Research Laboratory; Joric L. Stroup (57) ABSTRACT

Methods and systems are provided for foreign object debris monitoring in an environment with a dynamic debris field, such as an environment for operating an aircraft. The debris monitoring technique includes generating a light beam and dispersing it to create a virtual witness plate, which is a two-dimensional sheet of light that covers a detection area. The technique also include detecting scattered light from the virtual witness plate caused by debris passing through it. A debris event may be generated based on the scattered light, indicating the presence of debris in the detection area.

18 Claims, 6 Drawing Sheets

(51) Int. Cl.
*G01N 21/88* (2006.01)
*G01V 8/20* (2006.01)

(56) References Cited

OTHER PUBLICATIONS

Ferreira et al., "ImageJ User Guide," NIH ImageJ User's Group, 2012, at https://imagej.nih.gov/ij/docs/guide/index.html, 198 pages.

* cited by examiner

FOREIGN OBJECT DEBRIS DETECTION

CROSS-REFERENCE TO RELATED APPLICATIONS

This application is a non-provisional of and claims the benefit of U.S. provisional application No. 63/161,353, filed on Mar. 15, 2021, the entirety of which is incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing Navy Case No. 112741-US3.

BACKGROUND

Aircrafts can suffer major damage from foreign object debris (FOD), particularly when the debris enters the jet engine air inlets. Consequently, FOD is a leading cause of engine removal for jet engine aircrafts. FOD is any particle or substance, such as hail, ice, sand, or objects on the runway, that may cause damage to an aircraft. FOD may be encountered any time during flight operations, such as on runway surfaces during landings or takeoffs, or mid-flight, negatively affecting readiness and safety levels of an aircraft.

To reduce FOD on the runway, manual sweeps may be performed by crewmen walking shoulder-to-shoulder along the runway before a flight to search for and remove any foreign objects. However, this is labor-intensive and does not address the issue of FOD encountered while the aircraft is airborne. While there may be systems to monitor for debris on airport grounds, there are no dedicated FOD detection systems for use on aircrafts at the air intakes of aircraft engines.

To effectively prevent or minimize aircraft damage due to FOD, accurate information about FOD is needed, such as when or what type of FOD is encountered during flight operations.

SUMMARY

Methods and systems are provided for foreign object debris monitoring in an environment with a dynamic debris field, such as an environment for operating an aircraft.

A method for monitoring foreign object debris is described herein. The method includes generating a light beam and dispersing the light beam to create a virtual witness plate comprising a two-dimensional sheet of light that covers a detection area in an environment with a dynamic debris field. The method further includes detecting scattered light from the virtual witness plate caused by foreign object debris passing through the virtual witness plate. The method also includes generating a foreign object debris event based on the scattered light from the virtual witness plate, the foreign object debris event indicating a presence of the foreign object debris in the detection area.

A system for monitoring foreign object debris is also described herein. The system includes an optical source configured to generate a light beam. The system further includes a dispersive element configured to disperse the light beam to create a virtual witness plate comprising a two-dimensional sheet of light that covers a detection area in an environment with a dynamic debris field. The system also includes an optical detector configured to detect scattered light from the virtual witness plate caused by foreign object debris passing through the virtual witness plate. An electronic package is also included and is configured to generate a foreign object debris event, based on the scattered light, the foreign object debris event indicating a presence of the foreign object debris in the detection area.

Further features and advantages of the invention, as well as the structure and operation of various embodiments are described in detail below with reference to the accompanying drawings.

DETAILED DESCRIPTION

Definitions

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, it is submitted that it is within the knowledge of one skilled in the art to effect such feature, structure, or characteristic in connection with other embodiments whether or not explicitly described.

In describing and claiming the disclosed embodiments, the following terminology will be used in accordance with the definition set forth below.

As used herein, the singular forms "a," "an," "the," and "said" do not preclude plural referents, unless the content clearly dictates otherwise.

As used herein, the term "and/or" includes any and all combinations of one or more of the associated listed items.

As used herein, the term "about" or "approximately" when used in conjunction with a stated numerical value or range denotes somewhat more or somewhat less than the stated value or range, to within a range of ±10% of that stated.

Terminology used herein should not be construed as being "means-plus-function" language unless the term "means" is expressly used in association therewith.

Overview

Nearly every aviation platform suffers from readiness and safety issues due to debris ingestion. FOD that enters an aircraft engine can cause damage to compressor blades or other components of the engine, resulting in reduced performance, engine failure, or catastrophic failure of the engine that could lead to damage or destruction of the aircraft and potential loss of human life.

To mitigate the cost and safety risk due to FOD, a technique for on-wing FOD monitoring is described herein. FOD monitoring systems and methods for synthesizing and analyzing data from novel sensing technologies to quantify the risk of operating aircraft in an environment with a dynamic debris field are provided. This FOD monitoring technique may be provided as feedback to more complex FOD mitigation system(s). Due to the ability to continually refine the FOD monitoring technique, the overall FOD mitigation system may be improved to further reduce FOD events.

Example Embodiments

Figure 1:
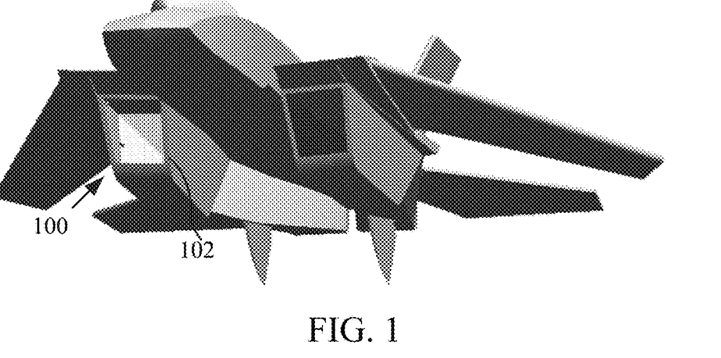
FIG. 1 depicts an aircraft on which a FOD monitoring system may be integrated.

FIG. 1 depicts an aircraft on which a FOD monitoring system may be integrated. For example, as shown in FIG. 1, FOD monitoring system 100 may be placed in an engine inlet 102. FOD monitoring system 100 may be placed in any suitable location on the aircraft where it may cover the desired detection area (e.g., engine inlet 102).

Figure 2:
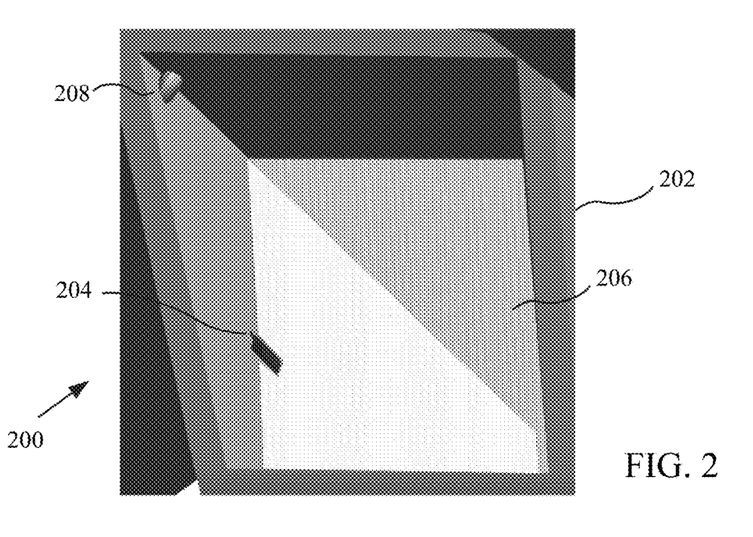
FIG. 2 depicts an engine inlet of the aircraft depicted in FIG. 1 with the integrated FOD monitoring system.

FIG. 2 depicts an engine inlet of the aircraft depicted in FIG. 1 with the integrated FOD monitoring system. FIG. 2 shows an internal configuration of FOD monitoring system 200 being placed inside engine inlet 202. As shown in FIG. 2, System 200 may be utilized to monitor a detection area (e.g., engine inlet 202) for FOD, including synthesizing, analyzing and/or characterizing data from novel sensing technologies to quantify the risk of operating the aircraft in an environment with a dynamic debris field. Such environment may be any operational space of the aircraft, including the taxi-way and runway, the deck of a ship, a forward deployed area (for vertical take-off and landing vehicles), the air while in flight. The environment may be a harsh one that may include external conditions such as sun light, rain, snow, fog, temperature and/or fluctuations thereof, humidity, sea salt, sand, exhaust fumes, aircraft vibration, etc. In such environment, it may be difficult to separate the FOD (e.g., hail, ice, sand, objects on or from the runway or airfield, or any other particle or substance that may cause aircraft damage) from background elements (e.g., moving turbine blades) or external conditions.

FIG. 2 shows system 200 as a modular system that includes a light source 204 that is configured to create a sheet of light inside engine inlet 202. This light sheet acts as a virtual witness plate (VWP) 206 for FOD passing through it. System 200 may also include an optical detector 208 configured to observe VWP 206 and detect light scattering off FOD passing through VWP 206. As shown in FIG. 2, optical detector 208 is positioned to point aft, into the engine inlet, to observe VWP 206. This is not intended to be limiting, as system 200 may be configured in any manner suitable for the application. For example, optical detector 208 may be positioned to point away from the engine inlet, and may have the wall of the inlet as the background. When FOD is detected, this detection may be characterized as a FOD event that may be stored for analysis after the aircraft lands or provide real-time indication of FOD via a display (not shown in FIG. 200) or via another system, such as an onboard notification system. The real-time indication of the FOD event may be transmitted to other systems (e.g., other aircraft in the vicinity, air station, airport, or carrier group) to provide alert regarding potential FOD hazard.

In embodiments, the components of the FOD monitoring system may be housed in a fashion that minimizes the impact to the aerodynamics and/or efficiency of the host platform while also protecting the system components from harsh operational environments. For example, the integration and/or placement of the FOD monitoring system on a host platform may depend on the platform itself, location of detection area, distance between the optical detector and the VWP (an angle with the widest view available is beneficial). There is no limit to the placement of the system components nor is there a limit on the application of the FOD monitoring system. For example, the FOD monitoring system may be placed in a natural gas pipeline or any location where monitoring may be desired. The detectable type/size of FOD depends on the system components selected (e.g., type, number, resolution or power of optical source(s), dispersive element(s), optical detector(s), etc.). Thus, the FOD monitoring may be utilized in many applications.

Figure 3:
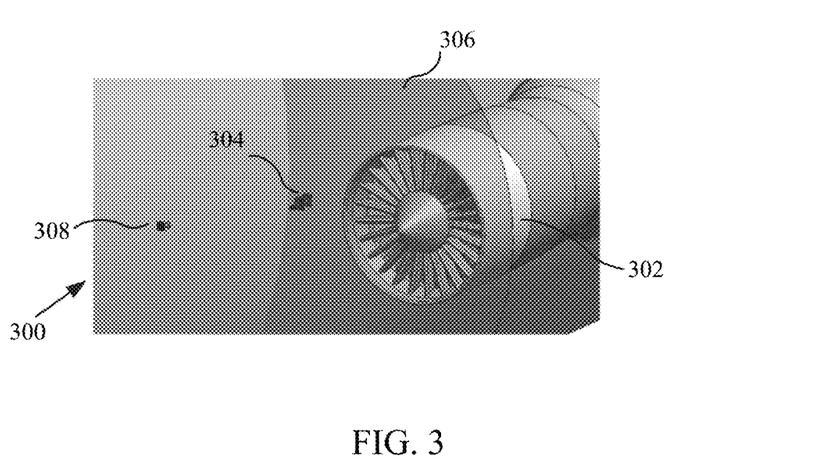
FIG. 3 depicts an external configuration of a FOD monitoring system.

FIG. 3 depicts an external configuration of a FOD monitoring system 300. In FIG. 3, system 300 is shown as an external configuration, in which the components of system 300 are placed on the exterior of engine intake 302. The external configuration may be desirable for engine designs that include cones that protrude beyond the cowling. System 300 may include optical source 304 for generating a collimated light beam. Alternatively, optical source 304 may include a laser and a collimator for generating the collimated light beam. A dispersive element (not shown in FIG. 3) may be used to disperse the collimated light beam to create VWP 306, which includes a two-dimensional sheet of light that covers a detection area (e.g., engine intake 302) in an environment with a dynamic debris field (e.g., an environment for operating an aircraft). For convenience and ease of implementation, embodiments are described with a collimated light beam being used to create the VWP. However, other techniques for generating the VWP may be possible. In embodiments, system 300 may utilize any technique to create the VWP, including ones that start with a collimated light beam which could be created using a point source and a lens or shaped mirror, or a collimated laser beam.

System 300 may further include optical detector 308 for detecting scattered light from VWP 306 caused by FOD passing through VWP 306. While not shown in FIG. 3, an electronic package (e.g., a system-on-chip, a processing unit or circuitry with storage device(s)) may also be included in system 300 to generate a FOD event based on the scattered light from VWP 306 to indicate a presence of FOD in the detection area. The electronic package may also include controller(s) and/or controlling system(s) for the other components (e.g., optical source or optical detector) of system 300.

Figure 4:
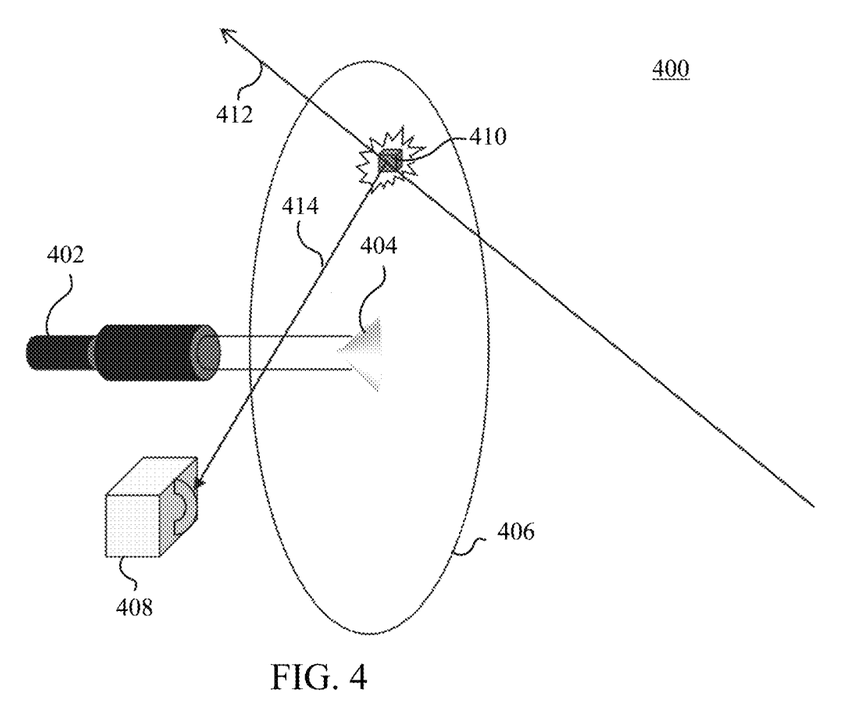
FIG. 4 depicts a perspective view of a FOD monitoring system, according to an example embodiment.

FIG. 4 depicts a perspective view of a FOD monitoring system, according to an example embodiment. In an embodiment, FOD monitoring system 400, shown in FIG. 4, may be integrated on an aircraft, similar to system 200 or 300 shown in FIGS. 2 and 3. System 400 may be utilized to perform FOD monitoring, including real-time or post-landing analysis of FOD encountered while the aircraft is operational. System 400 may include an optical source 402, a dispersive element 404, and an optical detector 408. As shown in FIG. 4, FOD 410 has a debris trajectory 412.

Optical source 402 may be a collimated light source or a laser (e.g., low power) connected to a collimator (e.g., a fiber collimator) via an optical fiber (single or multimode). In an example embodiment, optical source 402 may be a Coherent® model MX532-8000 Genesis series laser with a 532 nm output with an associated power supply. Dispersive element 404 is configured to disperse the collimated light from optical source 402 into VWP 406. Dispersive element 404 may be configured to transform a laser beam into a ring shaped distribution as shown in FIG. 4 or any other geometry (e.g., 75-degree fan) appropriate for the application. In embodiments, dispersive element 404 may be implemented with a mirror, conical lens, Powell lens, or axicon, etc. The light output of optical source 402 is not limited to the visible light spectrum. In embodiments, the output of optical source 402 may range from mid-infrared to near ultraviolet.

Optical detector 408 is configured to detect scattered light 414 from VWP 406 caused by foreign object debris 410 penetrating VWP 406. Optical detector 408 may be any detector suitable for optical source 402 and the application. In an embodiment, optical detector 408 may be positioned in a manner to view VWP 406 and capture sequential images of the detection area. For example, optical detector 408 may be implemented with any suitable cameras, such as a neuromorphic (event-based) camera, a complementary metal-oxide-semiconductor (CMOS), charge-coupled device (CCD) camera with a wide angle lens (e.g., a fish eye lens with a field of view of approximately 180°), for example, Ximea® model MD061MU-Sy. In this example, the camera may be fitted with a 6 mm f/1.8 lens and a narrow band (2 nm) filter centered at 532 nm, to match the 532 nm output from optical source 402. This lens has a 96.8×79.4 degree field of view when matched to a 1-inch size CCD chip, which provides an entrance pupil size (the effective light collecting area) of 3.3 mm in diameter (focal length divided by the f/number; 6/1.8=3.3 mm). Longer focal length lenses may have larger entrance pupils, but narrower fields of view. Also for this example, the camera may be set to capture 20 consecutive images using a 100 ms exposure for a total collection time of 2 seconds. A filter (e.g., SemRock® laser line filter) may be used to isolate just the wavelength from the laser output.

In an example embodiment, to increase the maximum frames per second collected and lower exposure times, the camera readout area may be set to a fraction (e.g., ¼) of its original size of 2752×2202. In this example, the camera is capable of acquiring 10 frames per second when using four available sensor taps and no pixel binning. Using this technique, each port only reads ¼ of the total sensor area, so the camera can take images four times faster. This adjustment allows the camera to reach exposure times as low as 25 ms. The FOD crossing the VWP may spend less than a millisecond in the VWP. Lowering the exposure time on the camera also lowers the background noise on each image. If the exposure time is set to 1 s, the background is integrated more than 1000 times longer than the time that the pellet is in the VWP scattering photons for the camera to detect. For fast FOD with low albedo the background can approach the event signal level. Albedo is a term used in astronomy that means the proportion of the incident light or radiation that is reflected by a surface, typically that of a planet or moon. Reducing the active area and splitting it equally across the four CCD ports enables the camera to be operated as fast as possible and reduces the background levels and hence increasing the signal to noise level.

While not shown in FIG. 4, system 400 may further include an electronic package configured to generate a FOD event based on scattered light 414 captured by optical detector 408, the FOD event indicating a presence of FOD 410 in the detection area. In an embodiment, the electronic package may be placed onboard the host platform of system 400. The electronic package may include a computer program (e.g., written in Python) to synthesize and/or analyze the collected data. The image analysis may include the following steps, although in example embodiments, not all steps have to be performed or in the order shown:

a. Load 20 images from a 2-second test sequence
b. Computer differenced images for each frame (F): $F-F_{prev}$ & $F-F_{next}$
c. Search an area of interest (AOI) for the peak value of the differenced images across all 20 images in shot sequence to find FOD
d. Re-center the zoomed difference image (+/−100 pixels) at the peak count pixel
e. Compute the total counts within a +/−15 pixel "Event Box" (size may vary depending on setup) centered on this peak value pixel
f. Compute the background, the total counts of the zoomed re-centered image minus the total events from the event box, divided by the # of pixels in the background area to get a background/pixel (Bck)
g. Compute the total counts in the event (Counts in Event Box−Background/pix*#pixels in Event Box)
h. Assign a total counts value as the average background subtracted total counts of the two differenced images Specific analysis examples are provided for the following monitoring system geometry distances: 34 cm (distance between the FOD intersection point and dispersive element), 44 cm (distance between the FOD intersection point and the camera), and 54 cm (distance between the camera and the dispersive element). The following is an analysis of a 20 shot sequence of a 6-mm diameter spherical light brown pellet with a mass of 0.12 g travelling at 510 feet per second (the high end of jet intake air speeds) and passed through a VWP created with a laser output set to 0.5 W. In this shot sequence, for a peak count rate of 589 counts with a background rate of 0.22 counts results in a signal to noise ratio above 2600:1. The percent difference between these background-subtracted totals is 4.3%. This represents one of the more stressing conditions, a white pellet with the same size and velocity yields approximately 125 k total counts; slower FOD yields higher returns as the FOD is in the VWP for a longer period of time. For a white 0.12 g pellet that enters a 0.5 W VWP at 471 feet per second. 190,000 counts is observed in the differenced images from the 100 ms exposures.

In an example embodiment, the detection threshold defining the minimum detectable signal Sc for a perfectly black background and no read or dark noise may be as low as 20 photons, which provides a Poisson signal-to-noise of more than $20/\sqrt{20} \approx 4.5$ for the total pulse from the FOD. A somewhat higher signal level may be desirable to exclude false positives. However, when the background is not perfectly black (as is more typical), random noise fluctuations in the background means that the total FOD signal must rise above the background fluctuations. For example, 1000 detected counts may be an effective minimum for the Ximea® model MD061MU-Sy with a non-ideal background. Note that when the debris is farther away, the signal level may be lower and thus a laser with a higher power may be needed for detecting the same debris. Thus, at high FOD velocities resulting in the short dwell times within the VWP, more laser power may be needed to detect particles of a certain size. At low velocities, the same particles may be detectible at lower laser power.

By comparing the sequential images, the detection time and location within the detection area may also be determined. The FOD event, along with associated data (e.g., viewing geometry or other parameters), may be stored (e.g., as Flexible Image Transport System (FITS) files) in a storage device within the electronic package for analysis later or to provide real-time notification of the FOD event to a user or another system (e.g., a notification system onboard the host platform). Event based detection may provide significant advantage in temporal resolution and reduction of data storage requirements.

Figure 5:
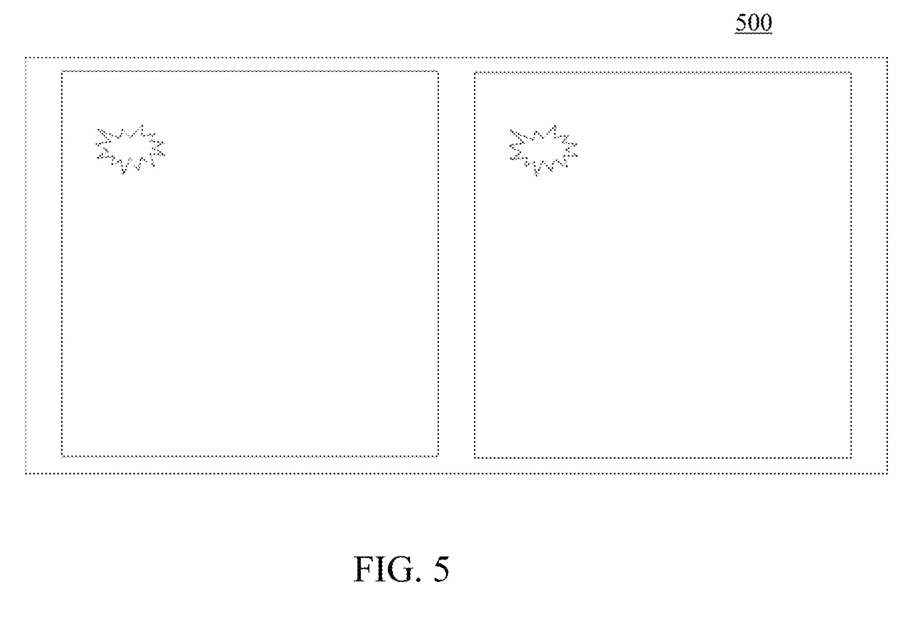
FIG. 5 depicts redundant images of a FOD detection event designed to reduce false alarms.

FIG. 5 depicts redundant images of a FOD detection event designed to reduce false alarms. False alarms may occur in a FOD detection system, for example, due to camera direction, dynamic background scenes, vibration, temperature, and entrained flow (e.g., when FOD appears with other substance or particles such as sand). A redundant imaging technique is described herein that may be utilized to avoid or reduce the number of false positives in a FOD monitoring system. For example, multiple cameras may be used in the FOD monitoring system. Alternatively, the focal plane of the camera may be configured to have redundant images on the same focal plane, as shown in FIG. 5. That is, the VWP may be reimaged onto two separate parts of the focal plane (e.g., using lens and beam splitter optics within the camera). With this technique, a FOD event is only declared if it appears in both images.

In embodiments, the FOD monitoring system may include multiple light sources to generate multiple VWPs to completely cover complex geometries of some engine air intakes. In addition, light of different wavelengths may be used for the different VWPs covering the same area to allow object discrimination such that one object type may be distinguished from another object type (e.g., rain from tire rubber, etc.) due to their wavelength dependent scattering properties. The different VWPs having different colors may also allow one FOD observation zone to be differentiated from another.

Figure 6:
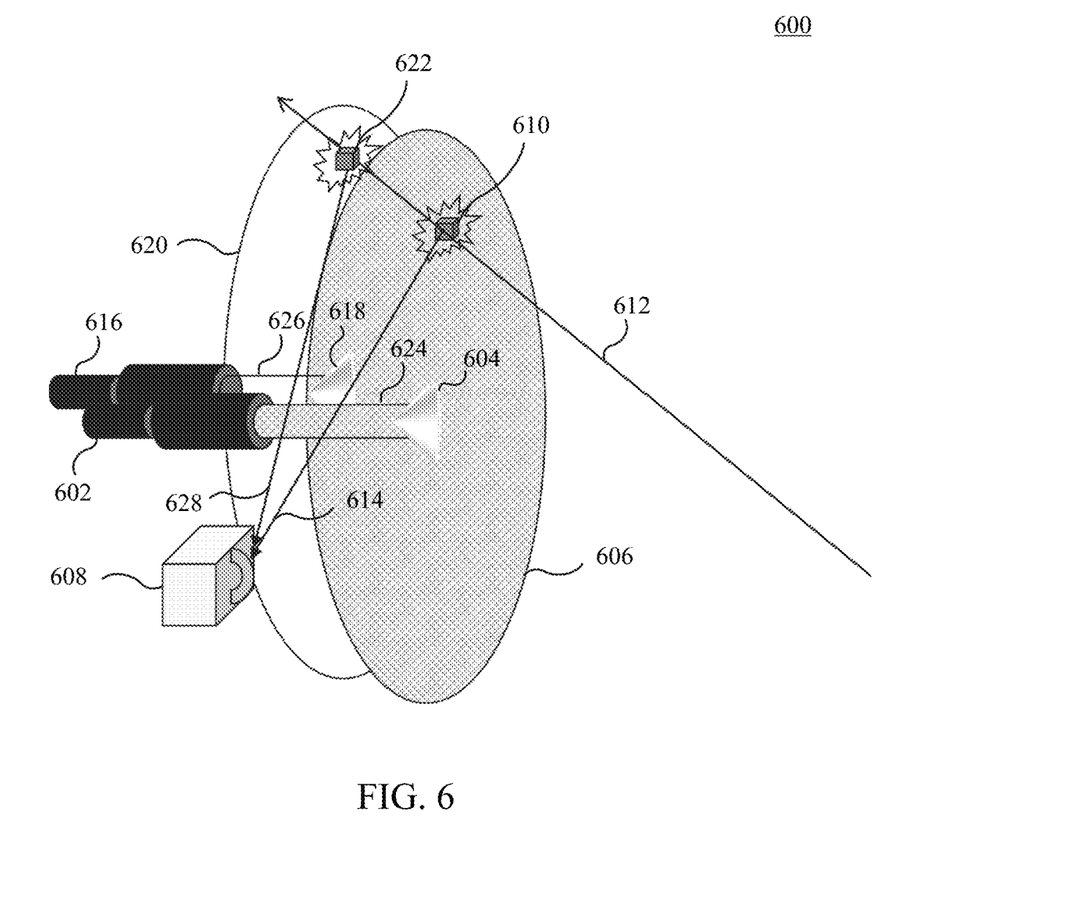
FIG. 6 depicts a perspective view of a FOD monitoring system having multiple optical sources, according to an example embodiment.

FIG. 6 depicts a perspective view of a FOD monitoring system having multiple optical sources, according to an example embodiment. System 600 shown in FIG. 6 similar to system 500 shown in FIG. 5, and may be similarly implemented, with an additional optical source and dispersive element to create another VWP. System 600 may include first optical source 602, second optical source 616, first dispersive element 604, second dispersive element 618 and optical detector 608. Each of first and second optical sources 602 and 616 may be configured to generate first collimated light beam 624 and second collimated light beam 626, respectively. First dispersive element 604 may be configured to disperse first collimated light beam 624 to create first VWP 606. Second dispersive element 618 may be configured to disperse second collimated light beam 626 to create second VWP 620. A debris object traveling on debris trajectory 612 may penetrate VWP 606 at a first location 610 at a first time causing scattered light 614 to be captured by optical detector 608. The same debris object may penetrate VWP 620 at a second location 622 at a second time causing scattered light 628 to be captured by optical detector 608. In this embodiment, the additional optical source, dispersive element, and VWP allows for retrieval of directional information. For example, different colors and filters may be used to separate the FOD signals and may provide direction and speed information of the debris object.

Figure 7:
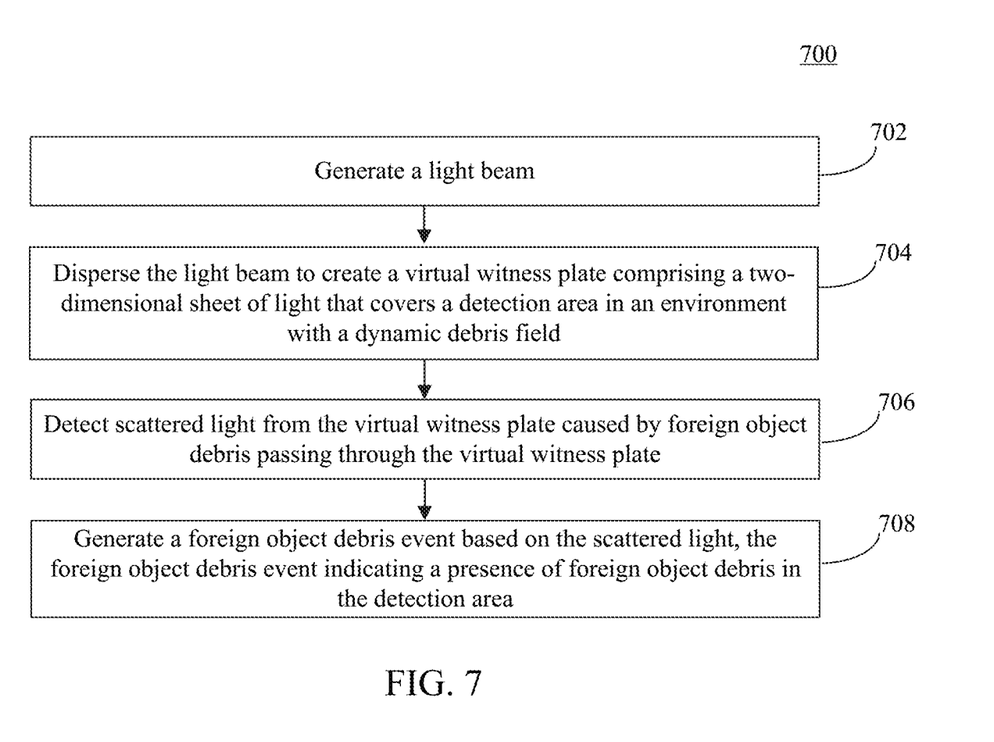
FIG. 7 depicts a flowchart providing a method for FOD monitoring, according to an example embodiment.

FIG. 7 depicts a flowchart 700 providing a method of FOD monitoring, according to an example embodiment. Flowchart 700 is described as follows with respect to system 400 for illustrative purposes.

Flowchart 700 begins with step 702. In step 702, a collimated light beam is generated. In an embodiment, the collimated light beam may be generated by any optical source, such as optical source 402 shown in FIG. 4. Any suitable process/component(s) may be utilized to generate a collimated light beam. For example, a laser may be used as a light source and a collimator (e.g., a curved mirror or lens) may be used to control the light from the laser such that it does not disperse or spread minimally as it propagates.

In step 704, the collimated light beam is dispersed to create a virtual witness plate comprising a two-dimensional sheet of light that covers a detection area in an environment with a dynamic debris field. In an embodiment, the VWP may be created by dispersing the collimated light beam from the optical source with a dispersive element, such as dispersive element 404 shown in FIG. 4. The geometry of the VWP may be specific to the application and/or the desired detection area. For example, a fan shape may work well for an internal configuration of the FOD monitoring system, whereas a circle may work better for an external configuration of the FOD monitoring system.

In step 706, scattered light is detected from the virtual witness plate caused by foreign object debris passing through the virtual witness plate. In an embodiment, scattered light may be detected by an optical detector, such as optical detector 408 shown in FIG. 4. When FOD penetrates the VWP, such as VWP 406 shown in FIG. 4, light may scatter off of the FOD and such light may be detected by optical detector 408. For a camera implementation of detector 408, the collected data may include sequential images of the detected area. Other forms of data may be collected, depending on the type of detector used.

In step 708, a foreign object debris event is generated based on the scattered light, the foreign object debris event indicating a presence of foreign object debris in the detection area. In an embodiment, an electronic package may be utilized to analyze data collected by the optical detector and to determine whether a FOD event occurred. Based on desired detection parameters and/or thresholds, a FOD signal derived from the collected data may be declared as a FOD event.

Figure 8:
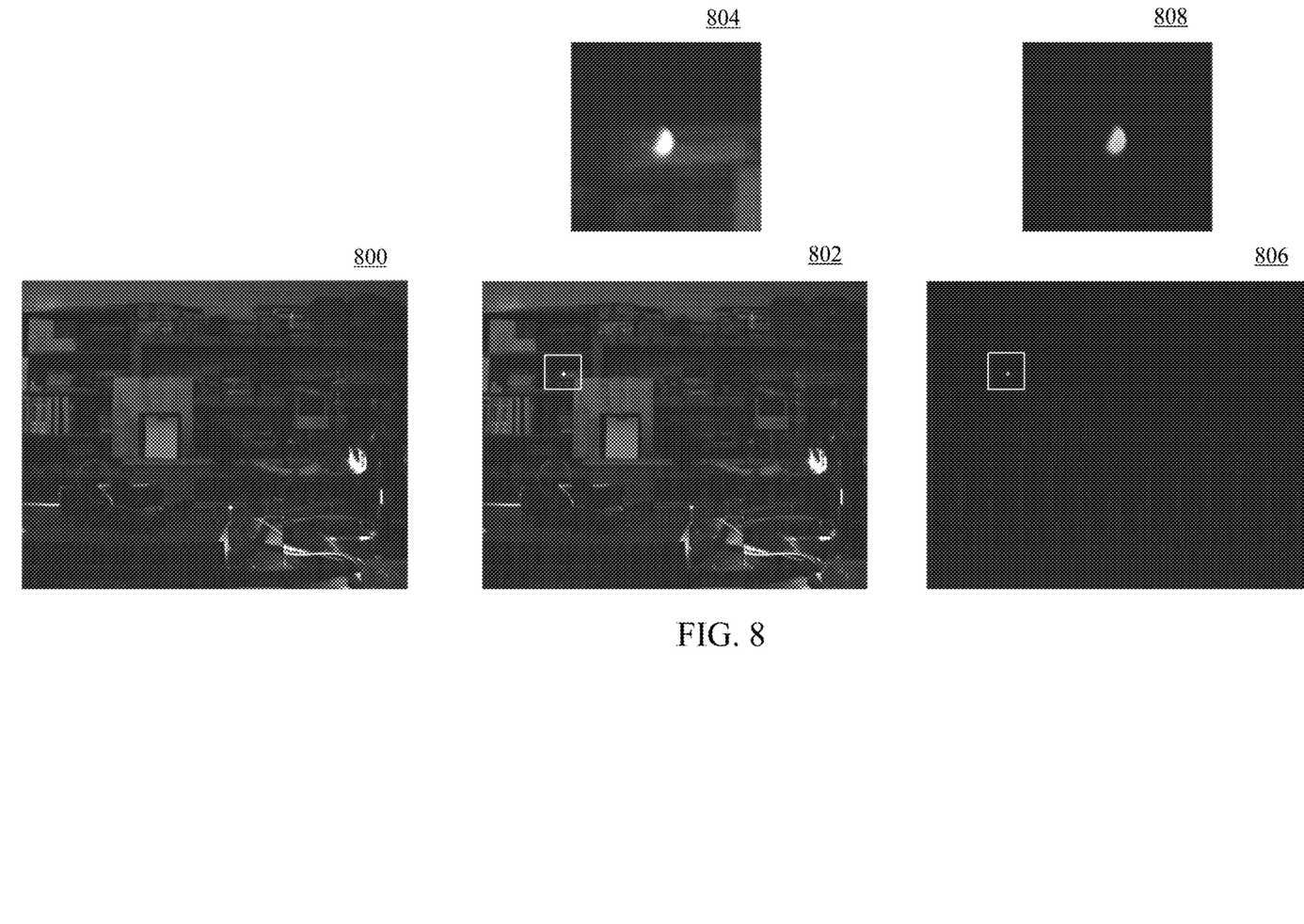
FIG. 8 depicts a series of images illustrating an image differencing technique.

FIG. 8 depicts a series of images illustrating an image differencing technique that may be utilized to determine whether a FOD event occurred. These images were collected in a laboratory setting with a spherical pellet being used as FOD for illustrative purposes. In image 800, a detection area is shown. In the next image in time, image 802, the same detection area is shown with the FOD highlighted in the white square. Image 804 is a close-up image of the FOD shown in image 802. Image 806 is a differenced image, which includes the difference between the two consecutive images, 800 and 802. In an embodiment, image 800 is subtracted from image 802 to remove the background scene to generate differenced image 806. The FOD may be easily discerned in image 806 after the background scene is removed. Image 808 is a close-up image of the FOD shown in differenced image 806. As shown in both images, 804 and 808, due to the location of illumination source and the spherical shape of the pellet, the illuminated portion visible to the camera has a half-moon shape due to the moon-phase effect.

Thus, in example embodiments, the difference between two consecutive images of the captured sequential images may be determined to generate a differenced image. For example, the image without the object may be subtracted from the image with the object to yield image(s) of the portion(s) of an object within the VWP and eliminated most of the irrelevant background objects. For fast debris particles detected against a slowly-changing background, the debris signal may be assumed to be present in a single image. Based on the differenced image, the FOD event may be identified. For example, an area of interest may be searched in multiple differenced frames of an image sequence, and the frame showing the largest difference may be selected and/or identified as the one with the FOD event.

The FOD monitoring systems described herein are highly customizable based on the selected components and/or operating parameters. In an example embodiment, the FOD monitoring system may operate with a given set of parameters, including minimum FOD size (e.g., 0.5 or smaller), maximum FOD velocity (e.g., 168 m/s based on takeoff/landing speed of 550 fps), run time (e.g., greater than one hour), vibration-high displacement (e.g., 2 mils peak-to-peak at 80-200 Hz), vibration-high frequency (e.g., 0.25 mils peak-to-peak at 2700-2800 Hz), operating temperature (e.g., −50 to 55° C.), non-operating temperature (e.g., −90 to 120° C.), maximum area (e.g., 1.5 m in diameter), or wavelength (e.g., visible spectrum for safety reasons). In addition, the size, weight, and power of the FOD monitoring system may be minimized (e.g., less than 3 kg or less than 10 W).

The advantages of the FOD monitoring technique described herein include customizable system configurations and ease of use. For example, the power of the light source may be specifically selected for the size and/or location of a particular engine air intake being observed. The light source power may also be selected for a particular FOD size, such that an increase in power allows for a decreased threshold object size of FOD that the FOD monitoring system is able to detect. In addition, the light source power and detector specification (e.g., camera resolution) may be tailored to the engine inlet size and desired detectable debris size. The FOD monitoring technique may be used during the day or at night, as sunlight is not relied upon as a source for the observed photons.

In addition, this FOD monitoring technique enables a condition-based maintenance of aircrafts rather than a scheduled-based one. With condition-based maintenance, maintenance decision may be performed based on the monitored structural health of the aircrafts leading to a reduction of costs and unscheduled downtime. The FOD monitoring technique provides reliable measurements and characterization of the FOD encountered for an accurate determination of the structural health of the aircrafts.

Example Computer System Implementation

Each of FOD monitoring system 400, FOD monitoring system 600, and flowchart 800 may be implemented in hardware, or hardware combined with software and/or firmware. For example, components of FOD monitoring system 400, FOD monitoring system 600, and flowchart 800 may be implemented as computer program code/instructions configured to be executed in one or more processors and stored in a computer readable storage medium. Alternatively, FOD monitoring system 400, FOD monitoring system 600, and flowchart 800 may be implemented as hardware logic/electrical circuitry.

For instance, in an embodiment, one or more, in any combination, each of FOD monitoring system 400 and FOD monitoring system 600 may be implemented together in a system-on-a-chip (SoC). The SoC may include an integrated circuit that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 9:
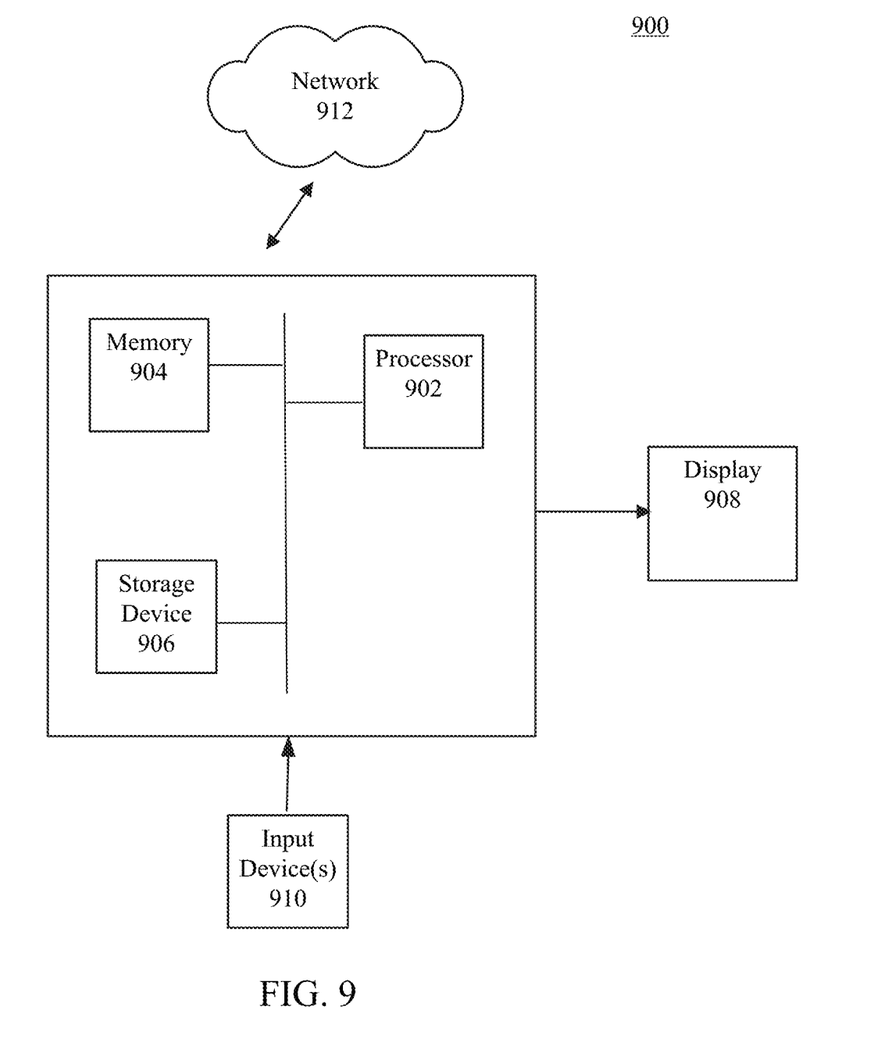
FIG. 9 depicts a block diagram of an example computer system in which embodiments may be implemented.

FIG. 9 is a block diagram of an example computer system in which embodiments may be implemented. The description of computing device 900 is provided for purposes of illustration, and is not intended to be limiting. Embodiments may be implemented in further types of computer systems, as would be known to persons skilled in the relevant art(s).

As shown in FIG. 9, computing device 900 includes processor 902, memory 904, and storage device 906, and these components may be coupled together via a bus.

Processor 902 may be referred to as a processor circuit or a processing unit. Processor 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor 902 may execute program code stored in a computer readable medium, such as program code of an operating system, an application program, and other programs.

Memory 904 includes any system memory, for example, read only memory (ROM) and random access memory (RAM) and may store a basic input/output system (e.g., BIOS).

Storage device 906 may include any of a hard disk drive, a magnetic disk drive, an optical disk drive, a removable optical disk (e.g., CD ROM, DVD ROM), a flash memory card, a digital video disk, RAMs, ROMs, or other hardware storage media. Storage device 906 and its associated computer readable media provide nonvolatile storage of computer-readable instructions, data structures, program modules and other data for computing device 900.

A number of program modules may be stored on memory 904 and/or storage device 906. These programs include an operating system, an application program, other programs, and program data. Such an application program or other programs may include, for example, computer program logic (e.g., computer program code or instructions) for implementing system components and/or embodiments described herein.

A user may enter commands and information into the computing device 900 through input devices 910 such as a keyboard and a pointing device. Other input devices (not shown) may include a microphone, joystick, game pad, satellite dish, scanner, touch screen and/or touch pad, voice recognition system to receive voice input, gesture recognition system to receive gesture input, or the like. These and other input devices are often connected to processor 902 through a serial port interface that is coupled to the bus, but may be connected by other interfaces, such as a parallel port, game port, or a universal serial bus (USB).

A display 908 is also connected to the bus via an interface, such as a video adapter. Display 908 may be external to, or incorporated in computing device 900. Display 908 may display information, as well as being a user interface for receiving user commands and/or other information (e.g., by touch, finger gestures, virtual keyboard, etc.). In addition to display 908, computing device 900 may include other peripheral output devices (not shown) such as speakers and printers.

Computing device 900 is connected to a network 912 (e.g., the Internet) through an adaptor or network interface, a modem, or other means for establishing communications over the network.

As used herein, the terms "computer program medium," "computer-readable medium," and "computer-readable storage medium" are used to refer to physical hardware media such as the hard disk associated with storage device 906. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

CONCLUSION

While various embodiments of the disclosed subject matter have been described above, it should be understood that they have been presented by way of example only, and not limitation. Various modifications and variations are possible without departing from the spirit and scope of the described embodiments. Accordingly, the breadth and scope of the disclosed subject matter should not be limited by any of the above-described exemplary embodiments.

What is claimed is:

1. A method for monitoring foreign object debris, comprising:
    generating a light beam;
    dispersing the light beam to create a virtual witness plate comprising a two-dimensional sheet of light that covers a detection area in an environment with a dynamic debris field;
    capturing images of the virtual witness plate over a period of time by a set of cameras of an optical detector, wherein the set of cameras are adapted to capture images of scattered light from the virtual witness plate;
    determining differences between consecutive ones of the images using computer differenced imaging, resulting in differenced images;
    determining peak pixel values of the difference images caused by scattered light from a foreign object crossing the virtual witness plate;
    detecting the foreign object passing through the virtual witness plate based on the peak pixel values of the differenced images; and
    generating a foreign object debris event based on the detecting the foreign object has passed through the virtual witness plate, the foreign object debris event indicating a presence of the foreign object in the detection area.

2. The method of claim 1, wherein the environment with the dynamic debris field comprises an environment for operating an aircraft, and the detection area comprises an area inside of an engine air inlet or in front of an engine air inlet.

3. The method of claim 1, further comprising at least one of:
    storing the foreign object debris event in a storage device; or
    providing the foreign object debris event in real time to a notification system.

4. The method of claim 1, further comprising:
    utilizing a redundant imaging technique to avoid false alarms, wherein the optical detector reimages the virtual witness plate onto two separate parts of a focal plane.

5. The method of claim 1, further comprising:
    generating a second light beam;
    dispersing the second light beam to create a second virtual witness plate comprising a second two-dimensional sheet of light that also covers the detection area; and
    detecting scattered light from the second virtual witness plate caused by the foreign object passing through the second virtual witness plate;
    wherein the generating the foreign object debris event is further based on the scattered light from the second virtual witness plate.

6. The method of claim 5, further comprising:
    obtaining at least one of direction information or speed information of the foreign object debris from the consecutive images of the set of cameras.

7. The method of claim 1, wherein the determining differences between consecutive ones of the images using computer differenced imaging comprises removing a background of a first one of the consecutive images from a subsequent one of the consecutive images to generate a differenced image including the difference.

8. The method of claim 1, wherein the consecutive ones of the images consist of a first image without scattered light from the foreign object passing through the virtual witness plate and a second image of scattered light from the foreign object passing through the virtual witness plate.

9. A system for monitoring foreign object debris, comprising:
    an optical source configured to generate a light beam;
    a dispersive element configured to disperse the light beam to create a virtual witness plate comprising a two-dimensional sheet of light that covers a detection area in an environment with a dynamic debris field;
    an optical detector including a set of cameras adapted to capture images of the virtual witness plate over a period of time, wherein optical detector is adapted to:
        capture images of scattered light from the virtual witness plate via the set of cameras:
        determine differences between consecutive ones of the images using computer differenced imaging, resulting in differenced images;
        determine peak pixel values of the differenced images caused by scattered light from a foreign object crossing the virtual witness plate; and
        detect the foreign object passing through the virtual witness plate based on the peak pixel values of the differenced images; and
    an electronic package configured to generate a foreign object debris event based on the detecting the foreign object has passed through the virtual witness plate, the foreign object debris event indicating a presence of the foreign object in the detection area.

10. The system of claim 9, wherein the environment with the dynamic debris field comprises an environment for operating an aircraft.

11. The system of claim 10, wherein the detection area comprising an area inside or in front of an engine air inlet.

12. The system of claim 9, further comprising:
a storage device configured to store the foreign object debris event.

13. A system of claim 9, further comprising:
a second optical source configured to generate a second light beam; and
a second dispersive element configured to disperse the second light beam to create a second virtual witness plate comprising a second two-dimensional sheet of light that also covers the detection area.

14. The system of claim 13, wherein the optical detector is further configured to detect scattered light from the second virtual witness plate caused by the foreign object passing through the second virtual witness plate; and
wherein the electronic package is further configured to generate the foreign object debris event based on the scattered light from the second virtual witness plate.

15. The system of claim 14, wherein the electronic package is further configured to obtain at least one of direction information or speed information regarding the foreign object from the ones of the consecutive images of the set of cameras.

16. The system of claim 9, wherein the set of cameras are configured to implement a redundant imaging technique to avoid false alarms.

17. The system of claim 9, wherein the determining differences between consecutive ones of the images using computer differenced imaging comprises removing a background of a first one of the consecutive images from a subsequent one of the consecutive images to generate a differenced image including the difference.

18. The system of claim 9, wherein the consecutive ones of the images consist of a first image without scattered light from the foreign object passing through the virtual witness plate and a second image of scattered light from a foreign object passing through the virtual witness plate.

* * * * *